No. 675,232. Patented May 28, 1901.
J. W. MOORE & J. A. WHITE.
FRICTION CLUTCH AND COUPLING.
(Application filed Oct. 23, 1899.)

(No Model.) 2 Sheets—Sheet 2.

Witnesses.
Robert S. Blake
Louis M. F. Whitehead

Inventors:-
John W. Moore.
James Atwood White.
by their Attorneys

UNITED STATES PATENT OFFICE.

JOHN W. MOORE AND JAMES ATWOOD WHITE, OF PHILADELPHIA, PENNSYLVANIA.

FRICTION CLUTCH AND COUPLING.

SPECIFICATION forming part of Letters Patent No. 675,232, dated May 28, 1901.

Application filed October 23, 1899. Serial No. 734,566. (No model.)

*To all whom it may concern:*

Be it known that we, JOHN W. MOORE and JAMES ATWOOD WHITE, citizens of the United States, and residents of Philadelphia, Pennsylvania, have invented certain Improvements in Friction Clutches and Couplings, of which the following is a specification.

Our invention consists of certain improvements in the friction clutch or shaft coupling for which we obtained Letters Patent No. 427,344, dated May 6, 1890.

The main object of our present invention is to so construct the clutch or coupling that the wooden friction-blocks with which the same is provided can be readily renewed without necessitating the practical dismantling of the structure. This object we attain in the manner hereinafter set forth, reference being had to the accompanying drawings, in which—

Figure 1:
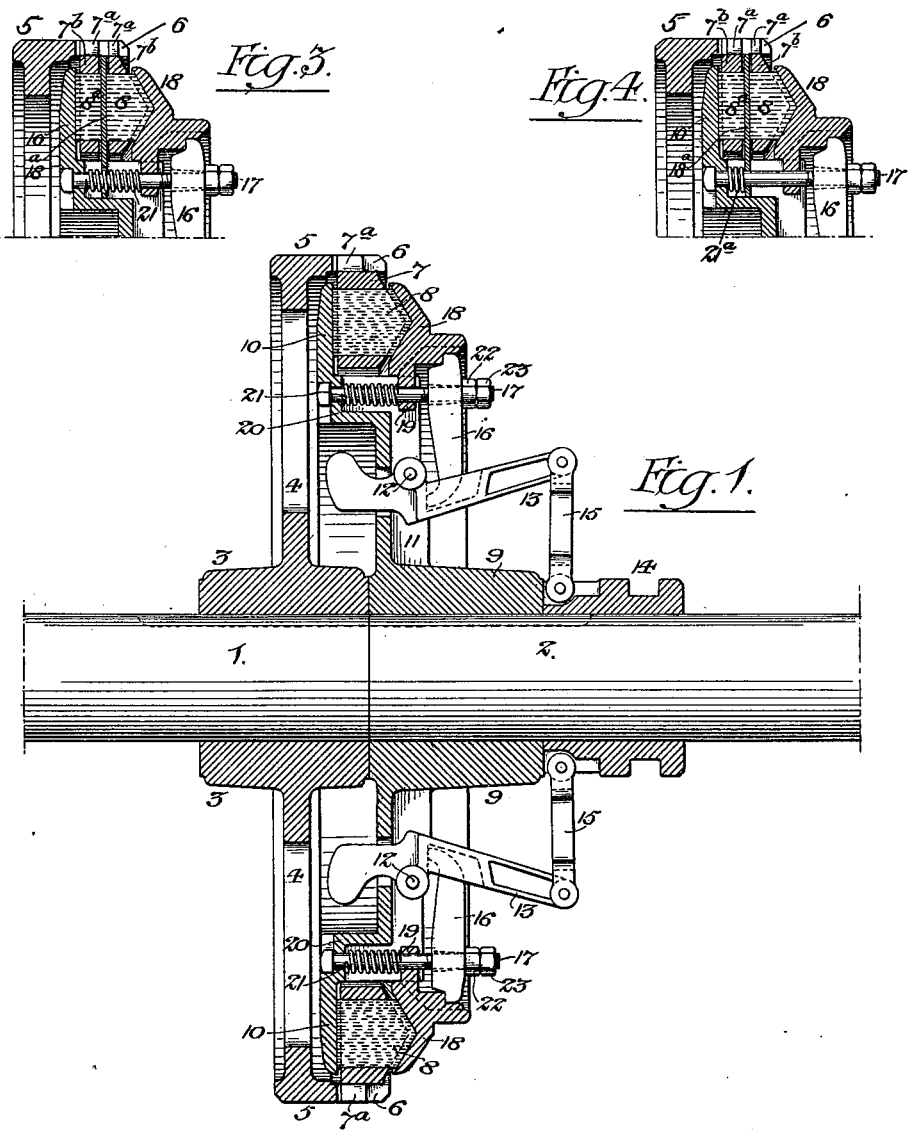
Figure 2:
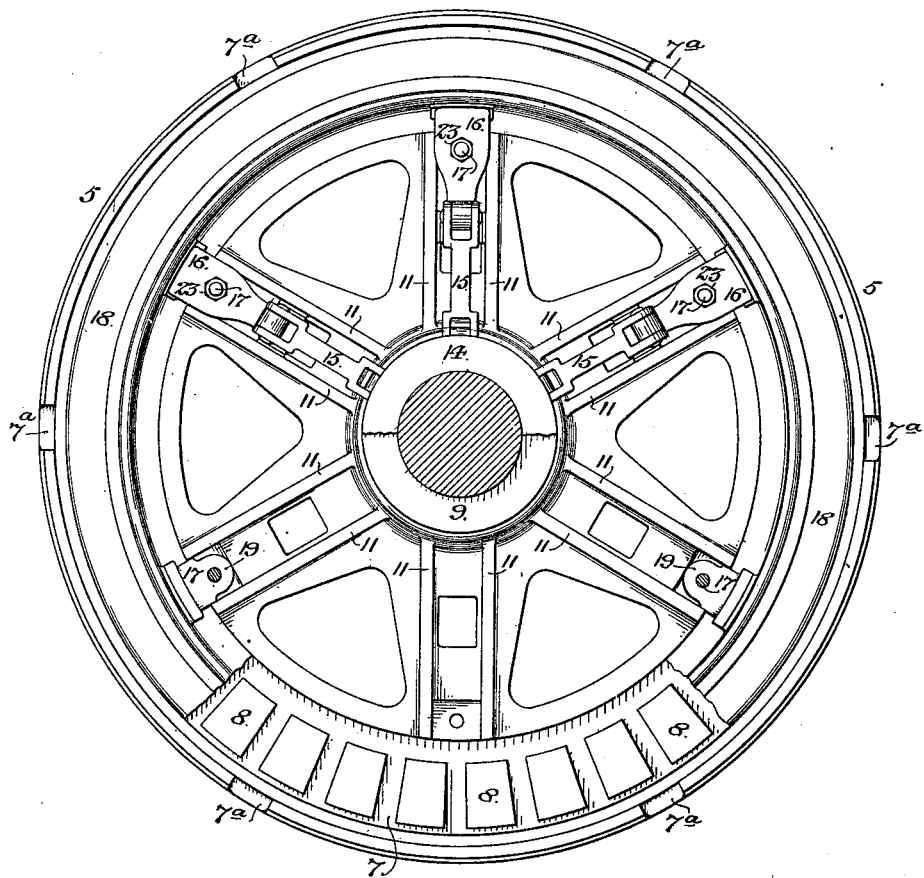

Figure 1 is a longitudinal section of a shaft-coupling constructed in accordance with our present invention. Fig. 2 is a front view of the same with some of the clutching elements removed or broken away in order to illustrate the construction of parts of the coupling which would otherwise be hidden thereby, and Figs. 3 and 4 are sectional views illustrating a special embodiment of our invention.

In Fig. 1 are represented the end portions of two shafts 1 and 2 which are to be coupled. The shaft 1 has a hub 3, with arms or spokes 4, carrying an annular flange 5, which has longitudinal slots 6 formed therein at intervals, six of these slots being shown in Fig. 2. Fitting snugly, but so as to slide freely in a longitudinal direction within this flange 5, is a ring 7, which has openings formed in it for the reception of the wooden friction-blocks 8, the latter projecting beyond both the front and rear faces of the ring, as shown in Fig. 1. The ring 7 also has outwardly-projecting lugs 7ª, which enter the slots 6 of the flange 5, so that the ring 7 is compelled to rotate with said flange. Secured to the shaft 2 is a hub 9, which carries a clutch-disk 10, the outer portion of said disk being adapted to bear against the rear faces of the wooden blocks 8 and the forward face of the disk having projecting ribs 11, which are arranged in pairs, as shown in Fig. 2, so as to provide means for supporting transverse pins 12, upon which are mounted levers 13, which can be caused to swing upon their pivots by the longitudinal movement of a sliding clutch-collar 14, mounted on the shaft 2, said clutch-collar being connected to the forwardly-projecting arms of the levers 13 by means of links 15. The levers 13 act upon other levers 16, which are hung upon bolts 17, mounted upon and projecting forwardly from the clutch-disk 10, the levers 16 acting upon a clutch-ring 18, which is adapted to bear upon the front faces of the wooden clutch-blocks 8, these front faces of the blocks and the engaging face of the ring 18 being reversely beveled or V-shaped, as shown in Fig. 1, so that the ring 18 will have a natural tendency to center itself upon the blocks when it is pressed against the same. The clutch-ring 18 has lugs 19, which project down between the ribs 11 of the clutch-disk 10, as shown in Fig. 2, and thus serve to insure the rotation of said ring 18 with the disk 10 without causing lateral strain upon the bolts 17, the latter passing through openings in the lugs 19, as shown in Fig. 1. The clutch-disk 10 has pockets 20 formed in it between each pair of lugs 11, these pockets being intended for the reception of coiled springs 21, which surround the bolts 17 and bear upon the lugs 19 of the clutch-ring 18, thereby serving to push said clutch-ring away from the clutch-disk 10 when it is relieved from the pressure of the levers 16. Each of these levers has a forward bearing upon a nut 22, screwed upon the outer threaded end of one of the bolts 17 and prevented from becoming loose by means of a lock-nut 23, applied to the bolt beyond the said nut 22.

By mounting the wooden friction-blocks 8 in the ring 7 independently of the clutch disk and ring said blocks can be readily applied, and when they become worn they can be readily renewed without removing any other parts of the coupling than the clutch-ring 18, its levers 16, and the retaining-nuts 22 and 23, the ring 7 being then free to be slipped out of engagement with the flange 5, and after the renewal of the blocks the parts can be reassembled with equal readiness. The ring 7, with its wooden friction-blocks, is free to move longitudinally in respect to the slotted flange 5, so that it is clamped between the clutch-disk 10 and clutch-ring 18 as an object will be clamped between the jaws of a vise, and good frictional contact of said clutch-disk 10 and clutch-ring 18 with the opposite faces of the wooden friction-blocks is thus insured.

In the construction shown in Figs. 3 and 4 a multiple block-carrying ring is employed, said ring having two sections 7ª, each engaging with the flange 5 and each having its complement of blocks 8, an intermediate clutch-ring 18ª being interposed between the two sets of blocks, but this ring having no engagement with the flange 5. The inwardly-projecting portion of the ring 18ª is perforated for the passage of the bolts 17 and also for the passage of certain of the springs 21, the remainder of the springs bearing upon the ring 18ª—as shown, for instance, at 21ª in Fig. 4. There may be more than two sections of the block-carrying ring and more than two interposed rings 18ª, if desired.

Although we have shown and described our invention as applied to a shaft-coupling, it will be evident that it is applicable to pulley-clutches as well.

Having thus described our invention, we claim and desire to secure by Letters Patent—

1. The combination in a friction clutch or coupling, of a flange secured to and rotating with the shaft or pulley, a ring mounted in said flange and having engaging portions whereby it is caused to rotate therewith but is permitted free longitudinal movement independent thereof, friction-blocks mounted in openings in said ring and projecting beyond the faces of the same, a clutch-disk mounted upon the shaft and engaging one face of each of said blocks, a clutch-ring engaging the other face of each of the blocks and lever mechanism whereby said clutch disk and ring are forced into frictional contact with the blocks, said lever mechanism so connected with the clutch-disk as to be out of the line of movement of the clutch-ring and the interposed ring carrying the friction-blocks, substantially as described.

2. The combination in a friction clutch or coupling, of a flange secured to and rotating with the shaft or pulley, a ring mounted within said flange and having engaging portions whereby it is caused to rotate therewith but is permitted free longitudinal movement independent thereof, friction-blocks contained in openings in said ring and projecting beyond the faces of the same, a clutch-disk mounted upon the shaft and engaging with one face of each of said blocks, a clutch-ring engaging with the other face of each of said blocks, and lever mechanism for forcing the clutch disk and ring into frictional contact with the blocks, and so connected with the clutch-disk as to be out of the line of movement of the clutch-ring and the interposed ring carrying the friction-blocks, the engaging faces of the clutch-ring and blocks being reversely beveled or V-shaped, substantially as specified.

3. The combination in a friction clutch or coupling, of a flange secured to the shaft or pulley so as to rotate therewith, a ring mounted in said flange and having engaging portions whereby it is caused to rotate therewith, friction-blocks mounted in said ring and projecting beyond the faces of the same, a clutch-disk bearing upon one face of each of said blocks, said clutch-disk having pairs of parallel ribs upon its face, a clutch-ring engaging with the opposite face of each of the blocks and having lugs fitting between said ribs of the clutch-disk, and lever mechanism for forcing the clutch disk and ring into frictional contact with the blocks, substantially as specified.

4. The combination in a friction clutch or coupling, of a flange secured to and rotating with the shaft or pulley, a ring mounted in said flange and having engaging portions whereby it is caused to rotate therewith, friction-blocks mounted in said ring and projecting beyond the faces of the same, a clutch-disk engaging with one face of each of said blocks, said clutch-disk having pairs of parallel ribs upon its face and pockets between said ribs, a clutch-ring engaging with the opposite face of each of the friction-blocks and having lugs fitting between the ribs of the clutch-disk, springs contained in the pockets of the disk and pressing forwardly upon said lugs, and lever mechanism whereby the clutch disk and ring are forced into frictional contact with the blocks, substantially as specified.

5. A friction clutch or coupling having in combination, a clutch disk and ring, a ring contained between said clutch disk and ring but independent of both, and connected to the part to be rotated so as to have longitudinal movement independent thereof, and friction-blocks carried by said interposed ring and engaged by the clutch disk and ring and means for pressing the clutch-disk and clutch-ring toward each other, so connected with the clutch-disk as to be out of the line of movement of the clutch-disk and interposed ring, whereby said interposed ring may be removed without dismantling the connections between the clutch-ring and the clutch-disk, substantially as specified.

6. The combination in a friction clutch or coupling of a flange secured to and rotating with the shaft or pulley, a sectional ring mounted within said flange and engaging therewith, friction-blocks carried by each section of the ring, a clutch-ring interposed between the blocks of one section and those of the adjoining section, a clutch-disk engaging with the blocks of the innermost section of the ring, a clutch-ring engaging with the blocks of the outermost section of the same, and mechanism for moving said latter clutch-ring from and toward the clutch-disk, said mechanism so connected with the clutch-disk as to
5 be out of the line of movement of the clutch-ring and the sectional ring, substantially as specified.

In testimony whereof we have signed our names to this specification in the presence of two subscribing witnesses.

JOHN W. MOORE.
    J. ATWOOD WHITE.

Witnesses:
 F. E. BECHTOLD,
 JOS. H. KLEIN.